(12) United States Patent
Natsumeda et al.

(10) Patent No.: US 9,116,270 B2
(45) Date of Patent: *Aug. 25, 2015

(54) OPTICAL ELEMENT, LIGHT SOURCE DEVICE, AND PROJECTION DISPLAY DEVICE

(75) Inventors: Masanao Natsumeda, Tokyo (JP); Masao Imai, Tokyo (JP); Goroh Saitoh, Tokyo (JP); Shin Tominaga, Toyko (JP)

(73) Assignee: NEC CORPORATION, Tokyo (JP)

( * ) Notice: Subject to any disclaimer, the term of this patent is extended or adjusted under 35 U.S.C. 154(b) by 381 days.

This patent is subject to a terminal disclaimer.

(21) Appl. No.: 13/580,697

(22) PCT Filed: Oct. 14, 2010

(86) PCT No.: PCT/JP2010/068012
§ 371 (c)(1),
(2), (4) Date: Oct. 11, 2012

(87) PCT Pub. No.: WO2011/108138
PCT Pub. Date: Sep. 9, 2011

(65) Prior Publication Data
US 2013/0033678 A1 Feb. 7, 2013

(30) Foreign Application Priority Data
Mar. 4, 2010 (JP) ................................. 2010-047944

(51) Int. Cl.
*G02F 1/01* (2006.01)
*F21V 8/00* (2006.01)
(Continued)

(52) U.S. Cl.
CPC ................. *G02B 6/005* (2013.01); *B82Y 20/00* (2013.01)

(58) Field of Classification Search
CPC ................................ G02B 6/005; B82Y 20/00
USPC ............. 353/20; 362/617, 611, 19, 84; 385/5; 359/342; 349/32, 62, 1, 5, 7, 8
See application file for complete search history.

(56) References Cited

U.S. PATENT DOCUMENTS

2003/0184989 A1 10/2003 Matsumoto et al.
2006/0278888 A1* 12/2006 Kim et al. ..................... 257/103
(Continued)

FOREIGN PATENT DOCUMENTS

CN 1216114 A 5/1999
CN 102549328 A 7/2012
(Continued)

OTHER PUBLICATIONS

The international search report for PCT/JP2010/068012 dated Nov. 16, 2010.
(Continued)

*Primary Examiner* — Christina Riddle
*Assistant Examiner* — Christopher Lamb, II
(74) *Attorney, Agent, or Firm* — Sughrue Mion, PLLC

(57) ABSTRACT

Disclosed is an optical element that includes: carrier generation layer (16) in which carriers are generated by light from light guide body (12) into which light from a light-emitting element enters; plasmon excitation layer (17) that has a plasma frequency higher than the frequency of light generated when carrier generation layer (16) is excited by light from the light-emitting element; and wave vector conversion layer (18) that converts surface plasmon generated by plasmon excitation layer (17) light having a predetermined exit angle to output the light. Plasmon excitation layer (17) is sandwiched between two layers having dielectric properties. The effective dielectric constant of the incident side portion of plasmon excitation layer (17) including an entire structure stacked above light guide body (12) side is higher than that of the exit side portion of plasmon excitation layer (17) including the entire structure stacked above wave vector conversion layer (18) side and the medium in contact with wave vector conversion layer (18).

17 Claims, 9 Drawing Sheets

(51) Int. Cl.
  *F21V 9/14* (2006.01)
  *G03B 21/14* (2006.01)
  *B82Y 20/00* (2011.01)

(56) References Cited

U.S. PATENT DOCUMENTS

2007/0181889 A1* 8/2007 Orita ............................... 257/79
2009/0086477 A1* 4/2009 Noba et al. ..................... 362/231
2012/0176766 A1* 7/2012 Natsumeda ..................... 362/19

FOREIGN PATENT DOCUMENTS

| JP | 2001067685 A | 3/2001 |
| JP | 2002063722 A | 2/2002 |
| JP | 2003295183 A | 10/2003 |
| JP | 2008145510 A | 6/2008 |
| JP | 2009087695 A | 4/2009 |

OTHER PUBLICATIONS

PhlatLight TM Photonic Grating LEDs for RPTV Light Engines Christian Hoepfner, SID Symposium Digest 37, 1808 (2006).

Wang, Guo-Xung et al. "The Research of MEMS Infrared Radiation Source Characteristics Based on Surface Plasmon Resonance Effect" Chinese Journal of Sensors and Actuators, Aug. 2008, vol. 21, No. 8, pp. 1353-1356, with English Abstract.

Chinese Office Action for CN Application No. 201080065176.5 issued on Mar. 21, 2014 with English Translation.

* cited by examiner

OPTICAL ELEMENT, LIGHT SOURCE DEVICE, AND PROJECTION DISPLAY DEVICE

TECHNICAL FIELD

The present invention relates to an optical element that uses surface plasmon to output light, a light source device, and a projection display device.

BACKGROUND ART

There has been proposed a light-emitting diode (LED) projector that uses a LED as a light-emitting element included in the light source device. The LED projector of this type includes a light source device having a LED, an illumination optical system into which light from the light source device enters, a light valve having a liquid crystal display plate into which light from the illumination optical system enters, and a projection optical system for projecting light from the light valve to a projection surface.

In the LED projector, to increase the luminance of a projected image, light loss must be prevented as much as possible on an optical path from the light source device to the light valve.

As described in Nonpatent Literature 1, there are restrictions based on etendue that are determined by the product of the area of the light source device and an emission angle. In other words, the light from the light source device is not used as projection light unless the value of the product of the light-emitting area of the light source device and the emission angle is set equal to or less than the value of the product of an incident surface area of the light valve and a capture angle (solid angle) determined by the F number of a projection lens.

Thus, in the light source device that includes the LED and an optical element into which light from the LED enters, reducing the light loss by lowering the etendue of light output from the optical element is an issue that requires attention.

In the light source device included in the LED projector, it is essential to achieve a projected luminous flux of about several thousand lumina by using a plurality of LEDs to compensate for a shortage of the amount of light emitted by a single LED.

As an example of such a light source using a plurality of LEDs, as shown in FIG. 1, Patent Literature 1 discloses a light source unit that includes a plurality of monochromatic light source devices 203a to 203f having LEDs 204a to 204f, optical axis matching members 202a to 202d for matching optical axes of lights output from monochromatic light sources 203a to 203f, light source sets 201a and 201b into which lights from optical axis matching members 202a to 202d enter, and light guiding device 200 into which the lights from light source sets 201a and 201b enter. In this light source unit, lights from the plurality of monochromatic light source devices 203a to 203f are synthesized, and lights that have emission angles narrowed by light source sets 201a and 201b enter light guiding device 200. In this configuration, light loss is reduced by narrowing the emission angles of the light incident on light guiding device 200 by light source sets 201a and 201b.

As another example of the light source device using the plurality of LEDs, as shown in FIG. 2, Patent Literature 2 discloses a light source device that includes light source substrate 301 having a plurality of LEDs 300 arranged on a plane. This light source device includes an optical element having two prism sheets 304 and 305 each having prism columns formed on one surface and arranged by setting the prism columns to intersect each other, and frame body 303 for supporting prism sheets 304 and 305. In the light source device, lights from the plurality of LEDs 300 are synthesized by two prism sheets 304 and 305.

CITATION LIST

Patent Literature

Patent Literature 1: JP2008-145510A
Patent Literature 2: JP2009-87695A

Nonpatent Literature

Nonpatent Literature 1: PhlatLight™ Photonic Grating LEDs for RPTV Light Engines Christian Hoepfner, SID Symposium Digest 37, 1808 (2006)

SUMMARY OF INVENTION

However, in the configuration described in Patent Literature 1, light-emitting areas on dichroic reflection surfaces of optical axis matching members 202a to 202d are larger than those of LEDs 204a to 204f. As a result, when the etendue of the light incident on light guiding device 200 is compared with that of the lights from LEDs 204a to 204f, there is no change in the etendue.

Thus, in the configuration described in Patent Literature 1, the etendue of the light output from light guiding device 200, which is dependent on the etendue of LEDs 204a to 204f, cannot be reduced.

In the configuration described in Patent Literature 2, the arrangement of the plurality of LEDs 300 on the plane causes an increase of the light-emitting area of the entire light source, and thus a problem arises in which there is an increase in the etendue of the light source itself.

In other words, in the configurations disclosed in Patent Literatures 1 and 2, the etendues of the lights from the light source unit and the light source device are dependent on that of the light from the LED, and hence the etendue of the light from the optical element cannot be reduced.

It is an object of the present invention to provide an optical element that can solve the abovementioned problems of the related technologies and reduce the etendue of light output from the optical element without any dependence on the etendue of a light-emitting element, a light source device that includes the same, and a projection display device.

Solution to Problems

To achieve the object, an optical element according to the present invention includes: a light guide body into which light from a light-emitting element enters; a carrier generation layer formed in the light guide body, in which carriers are generated by the light from the light guide body; a plasmon excitation layer stacked above the carrier generation layer, which has a plasma frequency higher than the frequency of light generated when the carrier generation layer is excited by the light from the light-emitting element; and an exit layer stacked above the plasmon excitation layer, which converts light incident from the plasmon excitation layer into light having a predetermined exit angle to output the light. The plasmon excitation layer is sandwiched between two layers having dielectric properties. The effective dielectric constant of the incident side portion of the plasmon excitation layer including the entire structure stacked above the light guide body side is higher than that of the exit side portion of the plasmon excitation layer including the entire structure stacked above the exit layer side and a medium in contact with the exit layer.

A light source device according to the present invention includes the optical element of the present invention, and a light-emitting element located on an outer circumference of the light guide body.

A projection display device according to the present invention includes the light source device of the present invention, a display element that modulates light output from the light source device, and a projection optical system that projects a projected image by light output from the display element.

Effects of Invention

According to the present invention, the etendue of the light from the optical element can be reduced without any dependence on the etendue of the light-emitting element.

DESCRIPTION OF EMBODIMENTS

Next, specific embodiments of the present invention will be described with reference to the accompanying drawings.

First Embodiment

Figure 1:
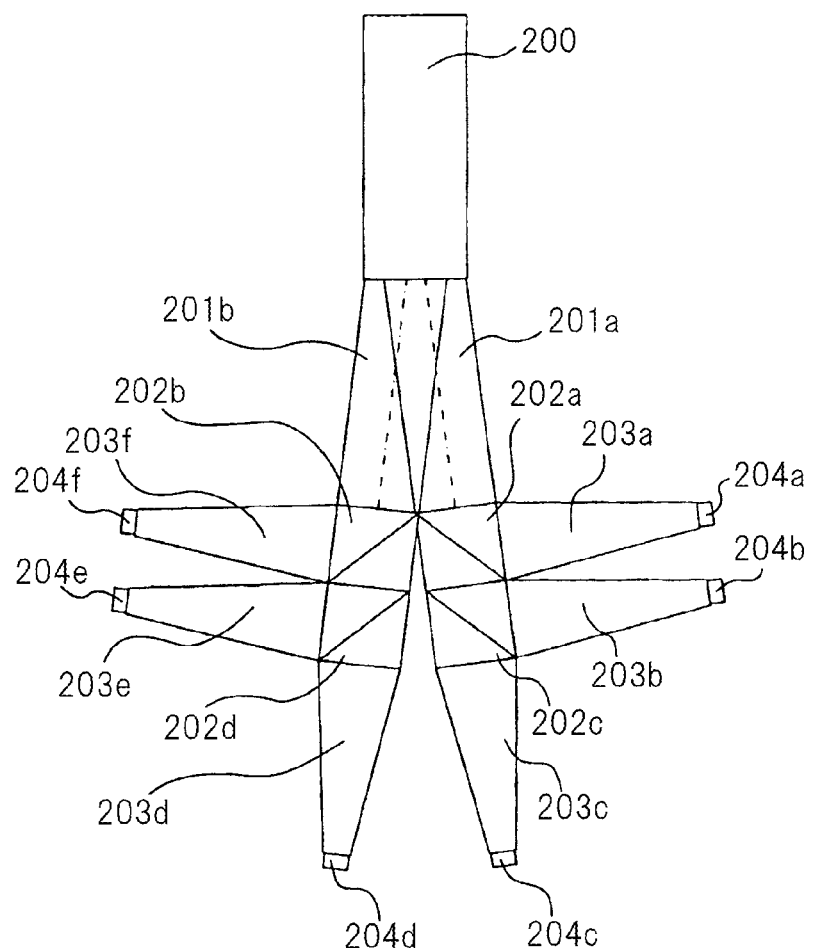
FIG. 1 is an explanatory schematic view showing a configuration according to Patent Literature 1.
Figure 2:
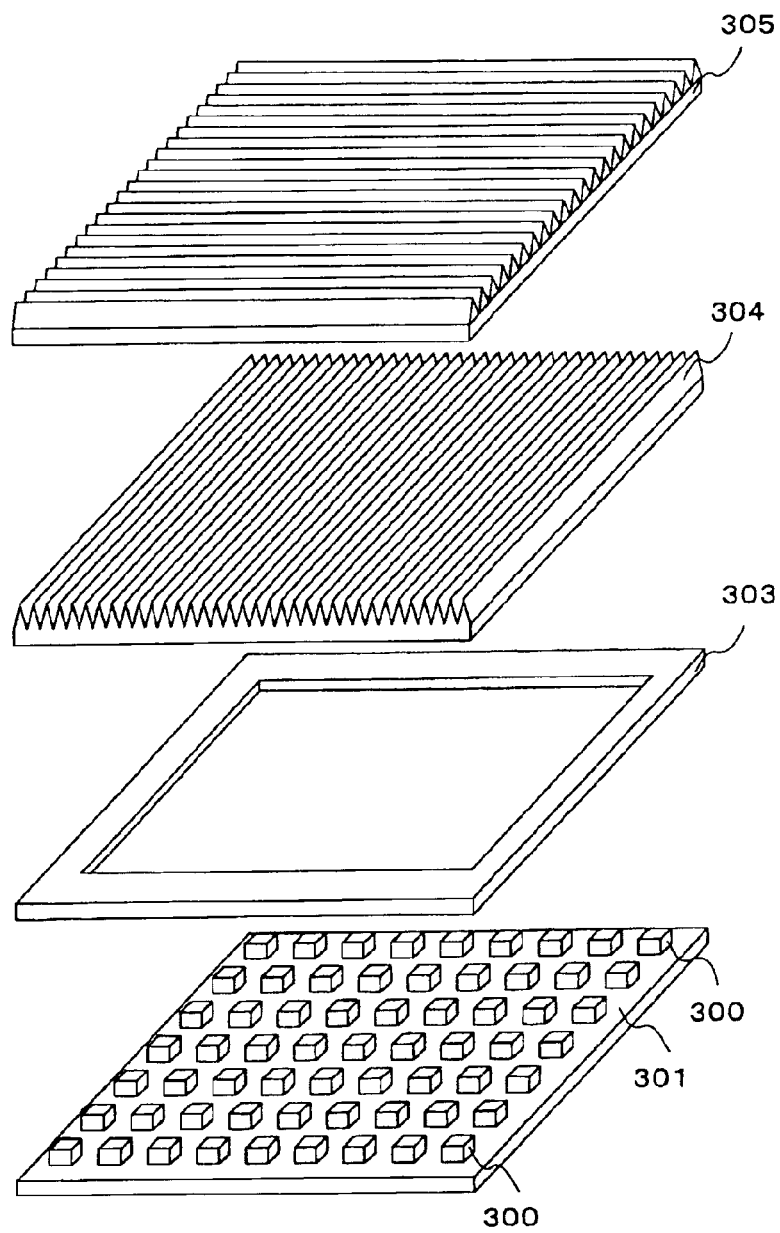
FIG. 2 is an explanatory exploded perspective view showing a configuration according to Patent Literature 2.
Figure 3:
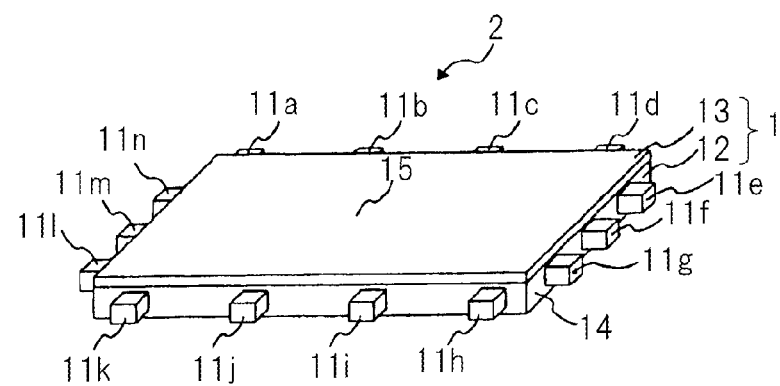
FIG. 3 is a perspective view schematically showing a light source device according to a first embodiment.
Figure 4:
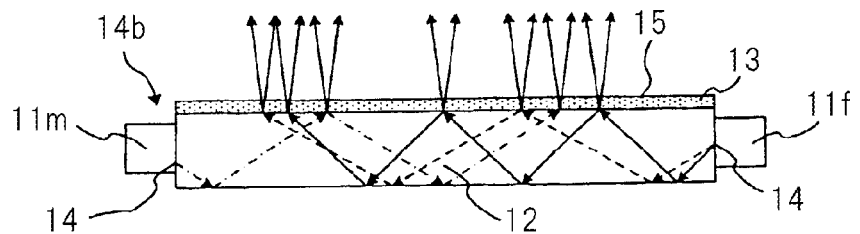
FIG. 4 is an explanatory sectional view showing behavior of light in the light source device according to the first embodiment.

FIG. 3 is a schematic perspective view showing a configuration of a light source device according to a first embodiment. FIG. 4 is an explanatory sectional view showing behavior of light in the light source device according to the present invention. In the light source device, individual layers actually have very large thicknesses, and there is a large difference in thickness among the layers. It is therefore difficult to draw the layers in accurate scale and proportion. Thus, in the drawings, the layers are not drawn in actual proportion, and hence are schematically shown.

As shown in FIGS. 3 and 4, light source device 2 according to the present embodiment includes a plurality of light-emitting elements 11 (11a to 11n) and optical element 1 into which lights output from light-emitting elements 11 enter. Optical element 1 includes light guide body 12 into which the lights output from light-emitting elements 11 enter, and directional control layer 13 for emitting output light by the light that enters from light guide body 12.

Figure 5:
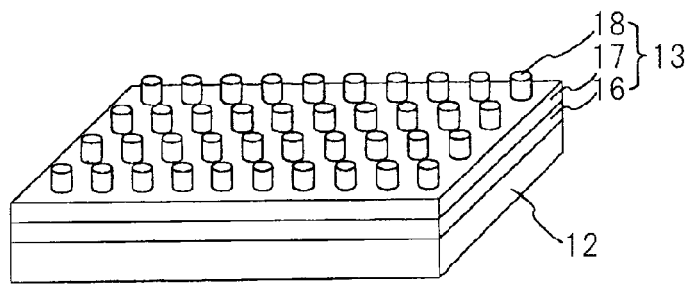
FIG. 5 is a perspective view schematically showing a directional control layer included in the light source device according to the first embodiment.

Directional control layer 13 is for improving directionality of output light from light source device 2. For example, as in the case of the first embodiment shown in FIG. 5, directional control layer 13 includes carrier generation layer 16 formed in light guide body 12, in which carriers are generated by a part of light incident from light guide body 12, plasmon excitation layer 17 stacked on carrier generation layer 16, which has a plasma frequency higher than the frequency of light generated when carrier generation layer 16 is excited by the light from the light-emitting element 11, and wave vector conversion layer 18 stacked on plasmon excitation layer 17, which is an exit layer for converting a wave vector of incident light of the surface plasmon generated by plasmon excitation layer 17 to output the light having a predetermined exit angle. In the embodiment, wave vector conversion layer 18 is disposed directly on plasmon excitation layer 17. However, a dielectric layer having a thickness smaller than 1 micrometer can be formed between wave vector conversion layer 18 and plasmon excitation layer 17.

Plasmon excitation layer 17 is sandwiched between two layers having dielectric properties. In the embodiment, the two layers correspond to carrier generation layer 16 and wave vector conversion layer 18. Optical element 1 according to the present embodiment is configured such that the effective dielectric constant of the incident side portion including the entire structure stacked on light guide body 12 side of plasmon excitation layer 17 (hereinafter, simply referred to as the incident side portion) is higher than that of the exit side portion including the entire structure stacked on wave vector conversion layer 18 side of plasmon excitation layer 17 and a medium brought into contact with wave vector conversion layer 18 (hereinafter, simply referred to as the exit side portion). The entire structure stacked on light guide body 12 side of plasmon excitation layer 17 includes light guide body 12. The entire structure stacked on wave vector conversion layer 18 side of plasmon excitation layer 17 includes wave vector conversion layer 18.

In other words, according to the first embodiment, the effective dielectric constant of the incident side portion including light guide body 12 and carrier generation layer 16 with respect to plasmon excitation layer 17 is higher than that of the exit side portion including wave vector conversion layer 180 and the medium with respect to plasmon excitation layer 17.

Specifically, the real part of the complex effective dielectric constant of the incident side portion (light-emitting element 11 side) of plasmon excitation layer 17 is set higher than that of the complex effective dielectric constant of the exit side portion (wave vector conversion layer 18 side) of plasmon excitation layer 17.

The complex effective dielectric constant $\epsilon_{eff}$ is represented by the following formula (1), in which an x axis and a y axis are directions parallel to the interface of plasmon excitation layer 17, a z axis is a direction vertical to the interface of plasmon excitation layer 17, $\omega$ is an angular frequency of light output from carrier generation layer 16, $\epsilon(\omega, x, y, \text{and } z)$ is a dielectric constant distribution of dielectrics in the incident side portion and the exit side portion with respect to plasmon excitation layer 17, $k_{spp,z}$ is a z component of a wave number of a surface plasmon, and j is an imaginary unit:

[Formula 1]

$$\epsilon_{eff} = \frac{\iiint_D \epsilon(\omega, x, y, z)\exp(2jk_{spp,z}z)}{\iiint_D \exp(z)} \quad \text{Formula (1)}$$

An integration range D is a range of three-dimensional coordinates of the incident side portion or the exit side portion with respect to plasmon excitation layer 17. In other words, the range of the x-axis and y-axis directions in the integration range D is a range up to the outer circumferential surface of the structure included in the incident side portion not including the medium, or the outer circumferential surface of the structure included in the exit surface portion not including the medium, and a range up to the outer edge in a plane parallel to the interface of plasmon excitation layer 17. The range of the z-axis direction in the integration range D is the range of the incident side portion or the exit side portion (including medium). The range of the z-axis direction in the integration range D is the range from an interface between plasmon excitation layer 17 and a layer having dielectric property and adjacent to plasmon excitation layer 17, which is set at a position of z=0, to the infinity of the adjacent layer side. A direction away from the interface is a (+) z direction in formula (1).

The z component $k_{spp,z}$ of the wave number of the surface plasmon and x and y components $k_{spp}$ of the wave number of the surface plasmon are represented by the following formulas (2) and (3), in which $\epsilon_{metal}$ is a real part of a dielectric constant of plasmon excitation layer 17, and $k_0$ is a wave number of light in vacuum:

[Formula 2]

$$k_{spp,z} = \sqrt{\epsilon_{eff} k_0^2 - k_{spp}^2} \quad \text{Formula (2)}$$

[Formula 3]

$$k_{spp} = k_0 \sqrt{\frac{\epsilon_{eff} \epsilon_{metal}}{\epsilon_{eff} + \epsilon_{metal}}} \quad \text{Formula (3)}$$

Thus, by using formulas (1) to (3) and inserting $\epsilon(\omega, x, y, \text{and } z)$ with a dielectric constant distribution $\epsilon_{in}(\omega, x, y, \text{and } z)$ of the incident side portion of plasmon excitation layer 17 and a dielectric constant distribution $\epsilon_{out}(\omega, x, y, \text{and } z)$ of the exit side portion of plasmon excitation layer 17, a complex effective dielectric constant $\epsilon_{effin}$ of the incident side portion and a complex effective dielectric constant $\epsilon_{effout}$ of the exit side portion with respect to plasmon excitation layer 17 are calculated. In reality, a complex effective dielectric constant $\epsilon_{eff}$ is easily acquired by providing an appropriate initial value as a complex effective dielectric constant $\epsilon_{eff}$ and by repeatedly calculating formulas (1) to (3). When a real part of the dielectric constant of a layer in contact with plasmon excitation layer 17 is very high, the z component $k_{spp,z}$ of the wave number of the surface plasmon in the interface becomes a real number. This is equivalent to not generating any surface plasmon in the interface. The dielectric constant of the layer in contact with plasmon excitation layer 17 accordingly corresponds to the effective dielectric constant in this case.

The effective interaction distance $d_{\mathit{eff}}$ of the surface plasmon when intensity of the surface plasmon is $e^{-2}$ is calculated by the following formula (4):

[Formula 4]

$$d_{\mathit{eff}} = \mathrm{Im}\left[\frac{1}{k_{\mathit{spp},z}}\right] \quad \text{Formula (4)}$$

Preferably, the imaginary part of a complex dielectric constant is set as small as possible at the medium adjacent to any layers including light guide body 12 or wave vector layer 18, excluding carrier generation layer 16 and plasmon excitation layer 17. Setting the imaginary part of the complex dielectric constant as small as possible facilitates plasmon coupling, enabling reduction of light loss.

The medium around light source device 2, namely, the medium in contact with light guide body 12 or wave vector conversion layer 18, can be anyone from among a solid substance, liquid, and gas. Media between light guide body 12 side and wave vector conversion layer 18 side can be different.

According to the present embodiment, the plurality of light-emitting elements 11a to 11n are arranged at predetermined intervals on four side faces of flat-plate light guide body 12. Surfaces where light-emitting elements 11a to 11n are in contact with the side faces are light incident surfaces 14. A laser diode, or a super luminescent diode is used, for light-emitting element 11, for example, the light-emitting diode (LED) for emitting light of a wavelength that carrier generation layer 16 can absorb. Light-emitting element 11 can be located away from light incident surface 14 of light guide body 12. For example, it can be optically connected to light guide body 12 by a light guiding member such as a light valve.

In the embodiment, light guide body 12 is formed into the flat-pate shape. However, the shape of light guide body 12 is not limited to a rectangular parallelepiped shape. A structure such as a microprism for controlling light distribution characteristics can be formed in light guide body 12. In light guide body 12, a reflection film can be formed on the full surface or a part of the outer circumference excluding light exit part 15 and light incident surface 14. Similarly, in light source device 2, a reflection film (not shown) can be formed on the full surface or a part of the outer circumference excluding light exit part 15 and light incident surface 14. For the reflection film, for example, a metallic material such as silver or aluminum or a dielectric multilayer film is used.

For carrier generation layer 16, for example, an organic phosphor such as rhodamine (Rhodamine 6G) or sulforhodamine (sulphorhofdamine 101), a fluorescent substance such as a CdSe or CdSe/ZnS quantum-dot phosphor, an inorganic material (semiconductor) such as GaN or GaAs, (thiophene/phenylene) co-oligomer, or an organic material (semiconductor material) such as Alq3 is used. When the fluorescent substance is used, in carrier generation layer 16, materials for generating fluorescence of a plurality of wavelengths that are equal or different in emission wavelength can be mixed. The thickness of carrier generation layer 16 is desirably 1 micrometer or less.

Plasmon excitation layer 17 is a particulate layer or a thin-film layer made of a material having a plasma frequency higher than the frequency (emission frequency) of light generated when single carrier generation layer 16 is excited by light of light-emitting element 1. In other words, plasmon excitation layer 17 has a negative dielectric constant at an emission frequency generated when single carrier generation layer 16 is excited by the light of light-emitting element 1.

Materials used for plasmon excitation layer 17 are, for example, gold, silver, copper, platinum, palladium, rhodium, osmium, ruthenium, iridium, iron, tin, zinc, cobalt, nickel, chromium, titanium, tantalum, tungsten, indium, and aluminum, or an alloy of these. Among the materials of plasmon excitation layer 17, gold, silver, copper, platinum, and aluminum, and an alloy mainly containing these materials is preferable, and gold, silver, and aluminum, and an alloy mainly containing these materials is particularly preferable. Plasmon excitation layer 17 is preferably formed with a thickness of 200 nanometers or less, more preferably 10 nanometers to 100 nanometers.

Wave vector conversion layer 18 is an exit layer for taking, by converting a wave vector of a surface plasmon excited on the interface between plasmon excitation layer 17 and wave vector conversion layer 18, light from the interface between plasmon excitation layer 17 and wave vector conversion layer 18 and outputting the light from optical element 1. In other words, wave vector conversion unit 18 converts the surface plasmon into light of a predetermined angle to output the light from optical element 1. That is, wave vector conversion layer 18 functions to output the light from optical element 1 to be almost orthogonal to the interface between plasmon excitation layer 17 and wave vector conversion layer 18.

For wave vector conversion layer 18, for example, a surface-relief grating, a periodic structure represented by a photonic crystal, a quasi-periodic structure or a quasi-crystal structure, a texture structure larger than a wavelength of light from optical element 1, such as a surface structure having a rough surface, a hologram, or a microlens array is used. The quasi-periodic structure is, for example, an incomplete periodic structure in which a part of a periodic structure is omitted. Among them, the periodic structure represented by the photonic crystal, the quasi-periodic structure, the quasi-crystal structure, and the microlens array are preferably used. This is because not only light taking-out efficiency can be increased but also directionality can be controlled. When a photonic crystal is used, a crystal structure desirably employs a triangular grating structure. Wave vector conversion layer 18 can employ a structure that includes a convex part formed on a flat-plate base.

Regarding light source device 2 thus configured, an operation of outputting light from light exit part 15 of directional control layer 13 by entering the light into directional control layer 13 from light-emitting layer 11 will be described.

As shown in FIG. 4, light output from, for example, light-emitting element 11f among the plurality of light-emitting elements 11, is transmitted through light incident surface 14 of light guide body 12, and propagated in light guide body 12 in a condition of total reflection. In this case, a part of the light incident on the interface between light guide body 12 and directional control layer 13 is output from light exit part 15 with a wavelength in a direction corresponding to characteristics, described below, of plasmon excitation layer 17 of directional control layer 13. Light not output from light exit part 15 is returned to light guide body 12, and a part of the light incident on the interface between light guide body 12 and directional control layer 13 is transmitted again through directional control layer 13 and output from light exit part 15. Through repetition of these operations, most of the light incident on light guide body 12 is output from light exit part 15. Light output from, among the plurality of light-emitting elements 11, light-emitting element 11m located opposite light-emitting element 11f that sandwiches light guide body 12 and that is transmitted through light incident surface 14 is similarly output from light exit part 15. The direction and wavelength of the light output from light exit part 15 depend only on the characteristics of directional control layer 13. The direction and the wavelength of this light are not dependent on the location of light-emitting element 11 and an incident angle on the interface between light guide body 12 and directional control layer 13. Hereinafter, unless specified otherwise, a configuration where wave vector conversion layer 18 has a photonic crystal structure will be described.

In the light that is propagated in light guide body 12 in a condition of total reflection, the condition of total reflection is broken on the interface between light guide body 12 and carrier generation layer 16, and the light from light-emitting element 11 enters into carrier generation layer 16. The light incident on carrier generation layer 16 generates carriers in carrier generation layer 16. The generated carrier causes plasmon coupling with free electrons in plasmon excitation layer 17. Through the plasmon coupling, surface plasmon is excited on the interface between plasmon excitation layer 17 and wave vector conversion layer 18. The excited surface plasmon is diffracted by wave vector conversion layer 18 to exit from light source device 2.

When a dielectric constant on the interface between plasmon excitation layer 17 and wave vector conversion layer 18 is spatially uniform, in other words, the interface is flat, the surface plasmon generated on the interface cannot be removed. Thus, according to the present invention, by providing wave vector conversion layer 18, the surface plasmon can be diffracted to be removed as light. The light output from one point of wave vector conversion layer 18 has an annular intensity distribution where the light concentrically spreads while being propagated. When an exit angle of highest intensity is set as a center exit angle, a center exit angle $\theta_{rad}$ of the light output from wave vector conversion layer 18 is represented by the following formula (5), in which $\Lambda$ is a pitch of the periodic structure of wave vector conversion layer 18, and i is a positive or negative integer:

[Formula 5]

$$\theta_{rad} = \mathrm{Sin}^{-1}\left(\frac{k_{spp} - i\frac{2\pi}{\Lambda}}{k_0}\right) \quad \text{Formula (5)}$$

Only a wave number near a wave number obtained by formula (3) is present on the interface between plasmon excitation layer 17 and wave vector conversion layer 18, and thus the angle distribution of output light obtained by formula (5) is narrowed.

Figure 6A:
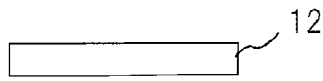
FIG. 6A is an explanatory sectional view showing a manufacturing process in the light source device according to the first embodiment.
Figure 6B:
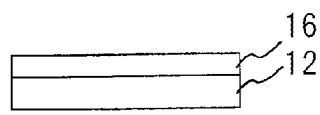
FIG. 6B is an explanatory sectional view showing the manufacturing process in the light source device according to the first embodiment.
Figure 6C:
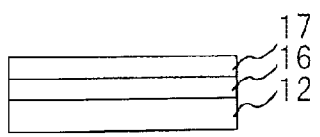
FIG. 6C is an explanatory sectional view showing the manufacturing process in the light source device according to the first embodiment.

FIGS. 6A to 6G show a manufacturing process of optical element 1 included in light source device 2. This process is only an example, and thus the present invention is not limited to this manufacturing method. First, as shown in FIGS. 6A and 6B, carrier generation layer 16 is deposited on light guide body 12 by spin-coating. Then, as shown in FIG. 6C, plasmon excitation layer 17 is formed on carrier generation layer 16 by, for example, physical vapor deposition, electron beam deposition, or sputtering.

Figure 6D:
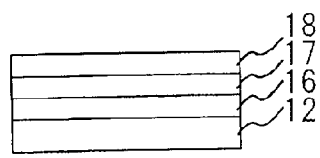
FIG. 6D is an explanatory sectional view showing the manufacturing process in the light source device according to the first embodiment.
Figure 6E:
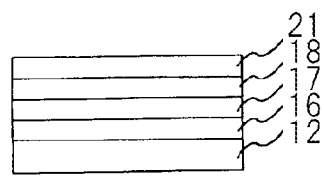
FIG. 6E is an explanatory sectional view showing the manufacturing process in the light source device according to the first embodiment.
Figure 6F:
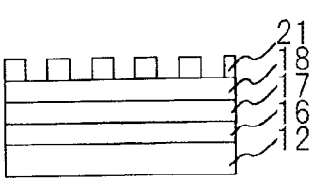
FIG. 6F is an explanatory sectional view showing the manufacturing process in the light source device according to the first embodiment.
Figure 6G:
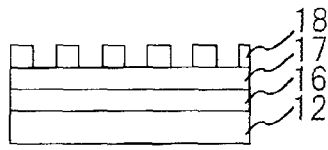
FIG. 6G is an explanatory sectional view showing the manufacturing process in the light source device according to the first embodiment.

Then, as shown in FIG. 6D, wave vector conversion layer 1 is formed on carrier generation layer 16 by a photonic crystal. As shown in FIG. 6E, resist film 21 is deposited on wave vector conversion layer 18 by spin coating. As shown in FIG. 6F, the negative pattern of the photonic crystal is transferred to resist film 21 by nano-imprinting. As shown in FIG. 6G, wave vector conversion layer 18 is etched to a desired depth by dry etching. Then, resist film 12 is peeled off from wave vector conversion layer 18. Lastly, a plurality of light-emitting elements 11 is arranged on the outer circumferential surface of light guide body 12 to complete light source device 2.

As described above, light source device 2 according to the present embodiment has a relatively simple configuration that includes directional control layer 13 formed in light guide body 12, and hence entire light source device 2 can be miniaturized. In light source device 2 according to the present embodiment, the exit angle of the light output from wave vector conversion layer 18 is determined by the complex dielectric constant of plasmon excitation layer 17, the effective dielectric constant of the incident side portion and the effective dielectric constant of the exit side portion sandwiching plasmon excitation layer 17, and a light emission spectrum of light generated in light source device 2. Thus, according to light source device 2 of the present embodiment, directionality of the light output from optical element 1 is not limited by that of light-emitting element 11. In light source device 2 according to the present embodiment, through application of the plasmon coupling during the emission, directionality of the output light can be improved by narrowing the emission angle of the light output from optical element 1. In other words, according to the present embodiment, the etendue of the light output from light source device 2 can be reduced without any dependence on the etendue of light-emitting element 11. The etendue of the light output from light source device 2 is not limited by the etendue of light-emitting element 11. Thus, lights incident from the plurality of light-emitting elements 11 can be synthesized while maintaining a small etendue of the light output from light source device 2.

In addition, the configuration disclosed in Japanese Patent Application Laid-Open No. 2008-145510 has a problem, namely, the inclusion of axis matching members 202a to 202d and light source sets 201a and 201b causes enlargement of the entire light source unit. However, according to optical element 1 of the present embodiment, entire optical element 1 can be miniaturized.

The configuration disclosed in Japanese Patent Application Laid-Open No. 2009-87695 has a problem, namely, the bending of the lights from the plurality of LEDs 300 in various directions at cross prism sheets 304 and 305 causes light loss. However, according to optical element 1 of the present embodiment, use efficiency of the lights from the plurality of light-emitting elements 11 can be improved.

Hereinafter, light source devices of other embodiments will be described. The light source devices of the other embodiments are different only as regards the configuration of directional control layer 13 from light source device 2 of the first embodiment, and thus only the directional control layer will be described. In the directional control layers of the other embodiments, layers similar to those of directional control layer 13 of the first embodiment are denoted by reference numerals similar to those of the first embodiment, and will not be described.

Second Embodiment

Figure 7:
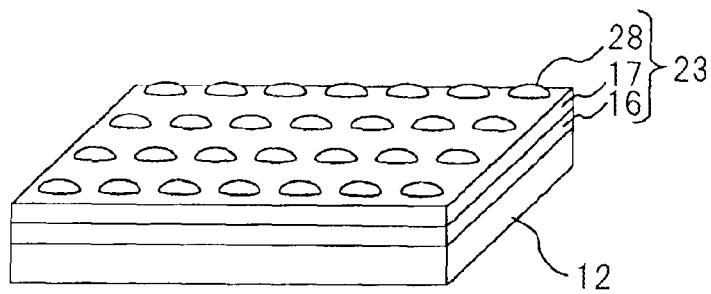
FIG. 7 is a perspective view schematically showing a light source device according to a second embodiment.

For wave vector conversion layer 18, in place of a photonic crystal, a configuration where a microlens array is disposed, or a configuration using a layer having a rough surface can be used. FIG. 7 is a perspective view schematically showing a directional control layer included in a light source device according to a second embodiment.

As shown in FIG. 7, in directional control layer 23, wave vector conversion layer 28 including a microlens array is disposed on the surface of plasmon excitation layer 17. Even in the configuration that includes wave vector conversion layer 28 including a microlens array, directional control layer 23 can provide the same effects as those in the configuration that includes wave vector conversion layer 18 made of the photonic crystal.

Figure 8A:
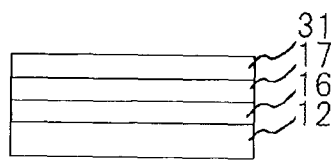
FIG. 8A is an explanatory sectional view showing a forming process of the microlens array in the light source device according to the second embodiment.
Figure 8B:
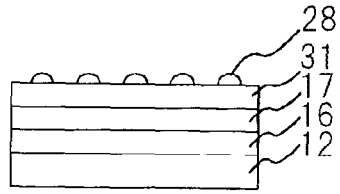
FIG. 8B is an explanatory sectional view showing the forming process of the microlens array in the light source device according to the second embodiment.

FIGS. 8A and 8B are explanatory sectional views showing the manufacturing process of a configuration where the microlens array is stacked on plasmon excitation layer 17. In the configuration including the microlens array, as in the case of the manufacturing method shown in FIGS. 6A to 6G, carrier generation layer 16 and plasmon excitation layer 17 are stacked on light guide body 12, and thus description of the manufacturing process thereof will be omitted.

As shown in FIGS. 8A and 8B, by using the manufacturing method shown in FIGS. 6A to 6G, after carrier generation layer 16 and plasmon excitation layer 17 have been stacked on light guide body 12, wave vector conversion layer 28 is formed on the surface of plasmon excitation layer 17 by the microlens array. This forming method is only an example, and thus the present invention is not limited to this method. As shown in FIG. 8A, UV (ultraviolet) cured resin 31 is deposited on the surface of the plasmon excitation layer 17 by spin-coating. Then, by using nano-printing, the desired lens array pattern is formed in UV cured resin 31. UV cured resin 31 is then irradiated with light to form a microlens array.

In directional control layer 23 of the second embodiment thus configured, by including wave vector conversion layer 28 that includes the microlens array, the same effects as those of the first embodiment can be provided.

In a third embodiment and after described below, a configuration where wave vector conversion layer 18 is made of a photonic crystal will be described. However, as described above, wave vector conversion layer 18 can be substituted with wave vector conversion layer 28 including a microlens array, and effects similar to those of each embodiment can be provided.

Third Embodiment

Figure 9:
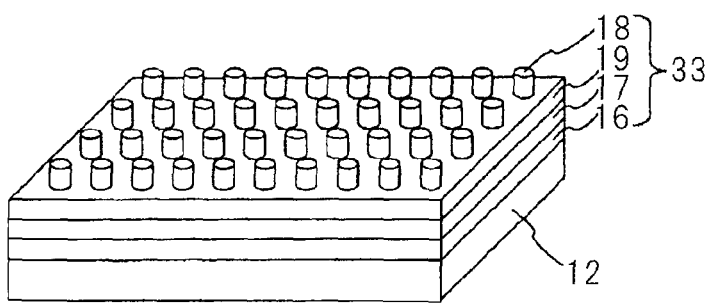
FIG. 9 is a perspective view schematically showing a directional control layer included in a light source device according to a third embodiment.

FIG. 9 is a perspective view showing a directional control layer included in a light source device according to a third embodiment. As shown in FIG. 9, in directional control layer 33 according to the third embodiment, carrier generation layer 16, plasmon excitation layer 17, dielectric constant layer 19, and wave vector conversion layer 18 are stacked in order on light guide body 12.

Thus, the third embodiment is different from the first embodiment in that dielectric constant layer 19 is independently disposed between plasmon excitation layer 17 and wave vector conversion layer 18. Dielectric constant layer 19 has a dielectric constant set lower than that of dielectric constant layer 20 (high dielectric constant layer 20) in a fourth embodiment described below, and thus will be referred to as low dielectric constant layer 19. For the dielectric constant of low dielectric constant layer 19, a range where the effective dielectric constant of the exit side portion is maintained lower than that of the effective dielectric constant of the incident side portion with respect to plasmon excitation layer 17 is permitted. In other words, the dielectric constant of low dielectric constant layer 19 does not need to be smaller than the effective dielectric constant of the incident side portion with respect to plasmon excitation layer 17.

Low dielectric constant layer 19 can be made of a material different from that of wave vector conversion layer 18. Thus, according to the present embodiment, the freedom of material selection can be increased for wave vector conversion layer 18.

For low dielectric constant layer 19, preferably, a thin film or a porous film made of, for example, $SiO_2$, $AlF_3$, $MgF_2$, $Na_3AlF_6$, NaF, LiF, $CaF_2$, $BaF_2$, and low dielectric constant plastic, is used. Low dielectric constant layer 19 is desirably thin as much as possible. The permitted maximum value of the thickness corresponds to the steeping length of the surface plasmon in the thickness direction of low dielectric constant layer 19, and is calculated by using formula (4). When the thickness of low dielectric constant layer 19 exceeds the value calculated by formula (4), it is difficult to remove the surface plasmon as light.

In directional control layer 33 of the third embodiment, to cause plasmon coupling on plasmon excitation layer 17, the effective dielectric constant of the incident side portion including light guide body 12 and carrier excitation layer 16 is set higher than that of the exit side portion including wave vector conversion layer 18 and low dielectric constant layer 19 and the medium in contact with t wave vector conversion layer 18.

According to directional control layer 33 of the third embodiment thus configured, effects similar to those of the first embodiment can be provided, and the inclusion of independent dielectric constant layer 19 facilitates adjustment of the effective dielectric constant of the exit side portion of plasmon excitation layer 17.

Fourth Embodiment

Figure 10:
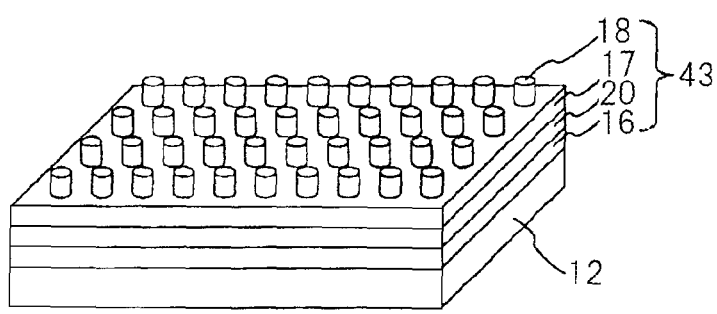
FIG. 10 is a perspective view schematically showing a directional control layer included in a light source device according to a fourth embodiment.

FIG. 10 is a perspective view showing a directional control layer included in a light source device according to the fourth embodiment. As shown in FIG. 10, in directional control layer 43 according to the fourth embodiment, carrier generation layer 16, dielectric constant layer 20, plasmon excitation layer 17, and wave vector conversion layer 18 made of photonic crystal are stacked in order on light guide body 12.

Thus, the fourth embodiment is different from the first embodiment in that dielectric constant layer 20 is independently disposed between plasmon excitation layer 17 and wave vector conversion layer 18. Dielectric constant layer 20 has a dielectric constant set higher than that of low dielectric constant layer 19 in the third embodiment, and thus will be referred to as high dielectric constant layer 20. For the dielectric constant of high dielectric constant layer 20, a range where the effective dielectric constant of the exit side portion is maintained lower than that of the effective dielectric constant of the incident side portion with respect to plasmon excitation layer 17 is permitted. In other words, the dielectric constant of high dielectric constant layer 20 does not need to be larger than the effective dielectric constant of the exit side portion with respect to plasmon excitation layer 17.

High dielectric constant layer 20 can be made of a material different from that of carrier generation layer 16. Thus, according to the present embodiment, the freedom of material selection can be increased for carrier generation layer 16.

For high dielectric constant layer 20, preferably, a thin film or a porous film made of a high dielectric constant material such as $TiO_2$, $CeO_2$, $Ta_2O_5$, $ZrO_2$, $Sb_2O_3$, $HfO_2$, $La_2O_3$, $NdO_3$, $Y_2O_3$, ZnO, $Nb_2O_5$ is used. High dielectric constant layer 20 is preferably made of a conductive material. High dielectric constant layer 20 is desirably as thin as possible. The permitted maximum value of the thickness corresponds to distance causing plasmon coupling between carrier generation layer 16 and plasmon excitation layer 17, and is calculated by formula (4).

In directional control layer 43 of the fourth embodiment, to cause plasmon coupling on plasmon excitation layer 17, the effective dielectric constant of the incident side portion including light guide body 12, carrier excitation layer 16, and high dielectric constant layer 20 is set higher than that of the exit side portion including wave vector conversion layer 18 and the medium in contact with t wave vector conversion layer 18.

According to directional control layer 43 of the fourth embodiment thus configured, effects similar to those of the first embodiment can be provided, and the inclusion of independent dielectric constant layer 20 facilitates adjustment of the effective dielectric constant of the incident side portion of plasmon excitation layer 17.

Fifth Embodiment

Figure 11:
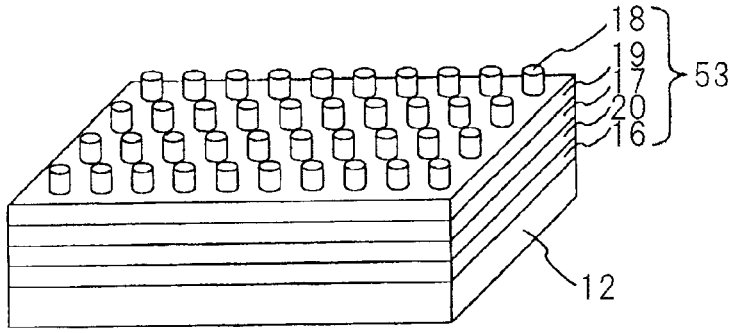
FIG. 11 is a perspective view schematically showing a directional control layer included in a light source device according to a fifth embodiment.

FIG. 11 is a perspective view showing a directional control layer included in a light source device according to the fifth embodiment. As shown in FIG. 11, directional control layer 53 includes low dielectric constant layer 19 sandwiched between plasmon excitation layer 17 and wave vector conversion layer 18, and high dielectric constant layer 20 sandwiched between carrier generation layer 16 and plasmon excitation layer 17 and having a dielectric constant higher than that of low dielectric constant layer 19.

In directional control layer 53 of the fifth embodiment, to cause plasmon coupling on plasmon excitation layer 17, the effective dielectric constant of the incident side portion including light guide body 12, carrier excitation layer 16, and high dielectric constant layer 20 is set higher than that of the exit side portion including wave vector conversion layer 18, low dielectric constant layer 19, and the medium contacted with wave vector conversion layer 18.

According to directional control layer 53 of the fifth embodiment thus configured, effects similar to those of the first embodiment can be provided, and the inclusion of independent low dielectric constant layer 19 and high dielectric constant layer 20 facilitates adjustment of the effective dielectric constant of the exit side portion of plasmon excitation layer 17 and the effective dielectric constant of the incident side portion of plasmon excitation layer 17. Directional control layer 53 of the fifth embodiment can provide the same effects as those of the first embodiment.

In the fifth embodiment, low dielectric constant layer 19 is located on wave vector conversion layer 18 side of plasmon excitation layer 17, and high dielectric layer 20 is located on carrier generation layer 16 side of plasmon excitation layer 17. However, the present invention is not limited to this configuration. To set the effective dielectric constant of the incident side portion of plasmon excitation layer 17 higher than that of the effective dielectric constant of the exit side portion of plasmon excitation layer 17, when necessary, the arrangement of low dielectric constant layer 19 and high dielectric constant layer 20 with respect to plasmon excitation layer 17 can be reversed from that of the fifth embodiment.

Sixth Embodiment

Figure 12:
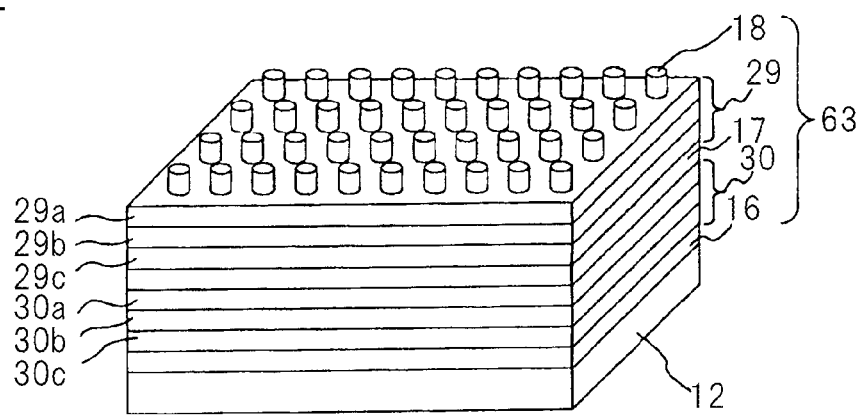
FIG. 12 is a perspective view schematically showing a directional control layer included in a light source device according to a sixth embodiment.

FIG. 11 is a perspective view showing the directional control layer included in a light source device according to the sixth embodiment. As shown in FIG. 12, directional control layer 63 according to the sixth embodiment is similar in configuration to directional control layer 53 of the fifth embodiment, but is different in that each of low dielectric constant layer 19 and high dielectric constant layer 20 is configured by stacking a plurality of dielectric layers.

Specifically, directional control layer 63 according to the sixth embodiment includes low dielectric constant layer group 29 formed by stacking a plurality of dielectric layers 29a to 29c and high dielectric constant layer group 30 formed by stacking a plurality of dielectric layers 30a to 30c.

In low dielectric constant layer group 29, the plurality of dielectric layers 29a to 29c are arranged so that dielectric constants can be monotonously decreased from near plasmon excitation layer 17 to wave vector conversion layer 18 side. Similarly, in high dielectric constant layer group 30, the plurality of dielectric layers 30a to 30c are arranged so that dielectric constants can be monotonously increased from near carrier generation layer 16 to plasmon excitation layer 17.

The overall thickness of low dielectric constant layer group 29 is equal to the thickness of the low dielectric constant layer in an embodiment where the directional control layer independently includes the low dielectric constant layer. Similarly, the overall thickness of high dielectric constant layer group 30 is equal to the thickness of the high dielectric constant layer in an embodiment where the directional control layer independently includes the high dielectric constant layer. Each of low dielectric constant layer group 29 and high dielectric constant layer group 30 is shown to have a three-layer structure. However, for example, a layer structure having two to five layers can be employed. When necessary, a configuration where the numbers of dielectric layers included in the low dielectric constant layer group and the high dielectric constant layer group are different or a configuration where only the low dielectric constant layer or the high dielectric constant layer includes a plurality of dielectric constant layers can be employed.

The inclusion of the pluralities of dielectric layers in the high dielectric constant layer and the low dielectric constant layer enables good setting of the dielectric constant of each dielectric layer adjacent to the interface of plasmon excitation layer 17 and enables matching of refractive indexes between adjacent dielectric layers. In other words, high dielectric layer constant group 30 can reduce the refractive index difference from wave vector conversion layer 18 or a medium such as air on the interface, while low dielectric layer constant group 29 can reduce the refractive index difference from carrier generation layer 16 on the interface.

According to directional control layer 63 of the sixth embodiment thus configured, the appropriate dielectric constant of each dielectric layer adjacent to plasmon excitation layer 17 can be set, and refractive index differences from carrier generation layer 16 and wave vector conversion layer 18 on the interface can be set small. As a result, light losses can be further reduced, and use efficiency of the light from light-emitting element 11 can be improved.

In place of low dielectric constant layer group 29 and high dielectric constant layer group 30, a single-layer film having a dielectric constant monotonously changed therein can be used. In the case of this configuration, a high dielectric constant layer has a dielectric constant distribution gradually increased from carrier generation layer 16 side to plasmon excitation layer 17 side. Similarly, a low dielectric constant layer has a dielectric constant distribution gradually reduced from plasmon excitation layer 17 side to wave vector conversion layer 18 side.

Seventh Embodiment

Figure 13:
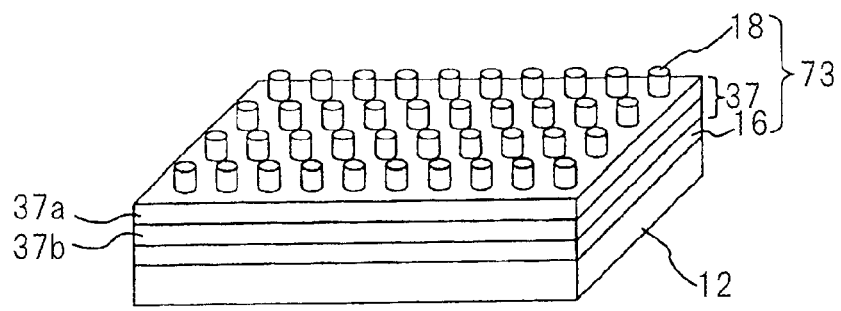
FIG. 13 is a perspective view schematically showing a directional control layer included in 25 a light source device according to a seventh embodiment.

FIG. 13 is a perspective view showing a directional control layer included in a light source device according to the seventh embodiment. As shown in FIG. 13, directional control layer 73 according to the seventh embodiment is similar in configuration to directional control layer 13 of the first embodiment, but different in that plasmon excitation layer group 37 includes a plurality of stacked metal layers 37a and 37b.

In plasmon excitation layer group 37 of directional control layer 73 according to the seventh embodiment, metal layers 37a and 37b are made of different metallic materials to be stacked. This enables plasmon excitation layer group 37 to adjust the plasma frequency.

When the plasma frequency is adjusted to be high in plasmon excitation layer group 37, for example, metal layers 37a and 37b are respectively made of Ag and Al. When the plasma frequency is adjusted to be low in plasmon excitation layer group 37, for example, metal layers 37a and 37b are respectively made of Ag and Au.

Plasmon excitation layer group 37 is shown to have a two-layered structure as an example.

Needless to say, however, plasmon excitation layer group 37 can include three or more metal layers when necessary. Plasmon excitation layer group 37 is preferably formed with a thickness equal to or less than 200 nanometers, more preferably about 10 nanometers to 100 nanometers.

According to directional control layer 73 of the seventh embodiment thus configured, plasmon excitation layer group 37 includes the plurality of metal layers 37a and 37b. This enables adjustment of an effective plasma frequency on plasmon excitation layer 37 close to the frequency of light incident on plasmon excitation layer group 37 from carrier generation layer 16. As a result, use efficiency of the light incident on optical element 1 from light-emitting element 11 can be further improved.

Eight Embodiment

Figure 14:
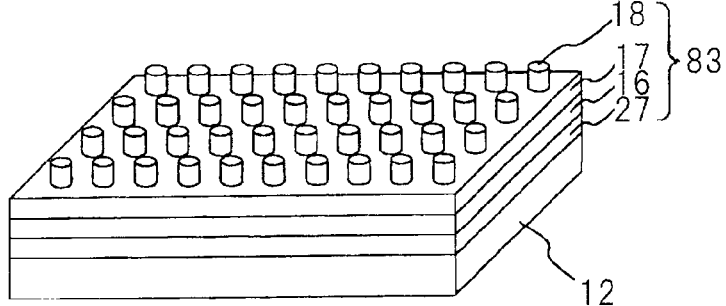
FIG. 14 is a perspective view schematically showing a directional control layer included in a light source device according to an eighth embodiment.

FIG. 14 is a perspective view showing the directional control layer included in the light source device according to the eighth embodiment. As shown in FIG. 14, directional control layer 83 according to the eighth embodiment includes plasmon excitation layer 27 as another plasmon excitation layer in addition to plasmon excitation layer 17 of the first embodiment.

In directional control layer 83 according to the eighth embodiment, plasmon excitation layer 27 is disposed between carrier generation layer 16 and light guide body 12. In directional control layer 83, a plasmon is excited on plasmon excitation layer 27 by light that enters from light guide body 12, and carriers are generated on carrier generation layer 16 by the excited plasmon.

In this case, to generate plasmon resonance on plasmon excitation layer 27, a dielectric constant of carrier generation layer 16 is set lower than that of light guide body 12. To widen the selection range of materials for carrier generation layer 16, a low dielectric constant layer where the real part of a complex dielectric constant is lower than light guide body 12 can be disposed between plasmon excitation layer 27 and carrier generation layer 16.

Plasmon excitation layer 27 has a plasma frequency higher than the light emission frequency generated when excitation occurs on single carrier generation layer 16 by light from light-emitting element 11. Plasmon excitation layer 27 has a plasma frequency higher than the light emission frequency of light-emitting element 11. When carrier generation layer 16 having a plurality of different light emission frequencies is used, plasmon excitation layer 27 has a plasma frequency higher than any one of light emission frequencies of light generated when excitation occurs on single carrier generation layer 16 by light from light-emitting element 11. Similarly, when a plurality of different types of light-emitting elements having different light emission frequencies is used, plasmon excitation layer 27 has a plasma frequency higher than any one of the different light emission frequencies of the light-emitting elements.

With this configuration, since the carriers are generated on carrier generation layer 16 by the plasmon, a fluorescence enhancement effect by the plasmon can be used.

According to the eighth embodiment thus configured, carriers can be efficiently generated on carrier generation layer 16 by the fluorescence enhancement effect of the plasmon, increasing the number of carriers, use efficiency of the light from light-emitting element 11 can be increased more.

As in the case of plasmon excitation layer group 37 of the seventh embodiment, plasmon excitation layer 27 can be configured by stacking a plurality of metal layers.

Ninth Embodiment

Figure 15:
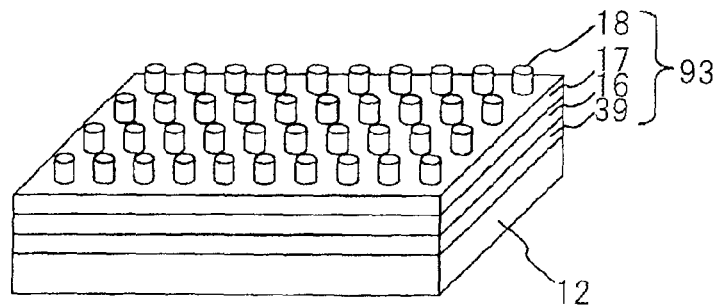
FIG. 15 is a perspective view schematically showing a directional control layer included in a light source device according to a ninth embodiment.

FIG. 15 is a perspective view showing a directional control layer included in a light source device according to the ninth embodiment. As shown in FIG. 15, directional control layer 93 according to the ninth embodiment is similar in configuration to directional control layer 13 of the first embodiment, but different in that low dielectric constant layer 39 is disposed between carrier generation layer 16 and light guide body 12 to operate differently from low dielectric constant layer 19 of the aforementioned embodiment.

In directional control layer 93 according to the ninth embodiment, low dielectric constant layer 39 is located directly below carrier generation layer 16. A dielectric constant of low dielectric constant layer 93 is set lower than that of light guide body 12. The incident angle with respect to light incident surface 14 of light guide body 12 is set to a predetermined angle so that light incident from light-emitting element 11 can be in a condition of total reflection on the interface between light guide body 12 and low dielectric constant layer 39.

The light incident on light guide body 12 from light-emitting element 11 is in a condition of total reflection on the interface between light guide body 12 and low dielectric constant layer 39. This total-reflection is accompanied by the generation of an evanescent wave. The evanescent wave acts on carrier generation layer 16 to generate carriers in carrier generation layer 16.

In the light source devices of the first to eighth embodiments, a part of the light output from light-emitting element 11 is transmitted through each layer and exits from each layer. Thus, corresponding to the emission wavelength of light-emitting element 11 and the emission wavelength of carrier generation layer 16, two types of lights that are different by 30 nanometers to 300 nanometers in wavelength are caused to exit from the light source device. However, as in the case of the present embodiment, by generating the carriers only by an evanescent wave, among the lights output from the light source device, the light corresponding to the emission wavelength of carrier generation layer 16 can be increased while the light corresponding to the emission wavelength of light-emitting element 11 is reduced. Thus, according to the ninth embodiment, use efficiency of the light from light-emitting element 11 can be improved.

Tenth Embodiment

Figure 16:
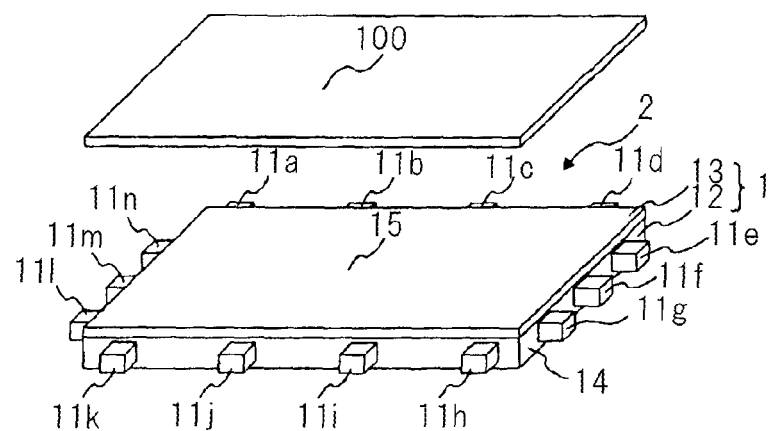
FIG. 16 is a perspective view showing a light source unit according to a tenth embodiment.

FIG. 16 is a perspective view showing a light source unit according to the tenth embodiment. As shown in FIG. 16, the light source unit according to the tenth embodiment includes, as a polarizing conversion element for arranging axially symmetric polarized light incident from optical element 1 in a predetermined polarized state, axially symmetric polarization ½ wavelength plate 100 for linearly polarizing the light incident from optical element 1. Linearly polarizing light output from light source device 2 by axially symmetric polarization ½ wavelength plate 100 can realize a light source unit, where a polarized state of the output light is uniform. Arranging the axially symmetric polarized light in the predetermined state by the polarizing conversion element is not limited to linear polarizing. Circular polarizing is also included. As a directional control layer included in the light guide device of the present embodiment, needless to say, any of the directional control layers according to the first to ninth embodiments can be applied.

Figure 17:
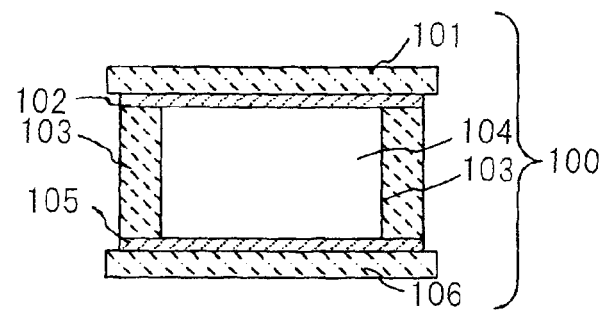
FIG. 17 is a vertical sectional view showing a structure of a ½ wavelength plate for axially symmetric polarization included in the light source unit according to the tenth embodiment.

FIG. 17 is a vertical sectional view showing the structure of ½ wavelength plate 100 for axially symmetric polarization. The configuration of axially symmetric polarization ½ wavelength plate 100 is only an example, and thus is in no way limitative. As shown in FIG. 17, axially symmetric polarization ½ wavelength plate 100 includes a pair of glass substrates 101 and 106 in which oriented films 102 and 105 are respectively formed, liquid crystal layer 104 located by sandwiching oriented films 102 and 105 of glass substrates 101 and 106 opposite each other between glass substrates 101 and 106, and spacer 103 located between glass substrates 101 and 106.

For liquid crystal layer 104, a refractive index ne is larger than a refractive index no, where no is the refractive index for ordinary light, and ne is the refractive index for extraordinary light. A thickness d of liquid crystal layer 104 satisfies (ne−no)×d=λ/2, where λ is a wavelength of incident light in vacuum.

Figure 18A:
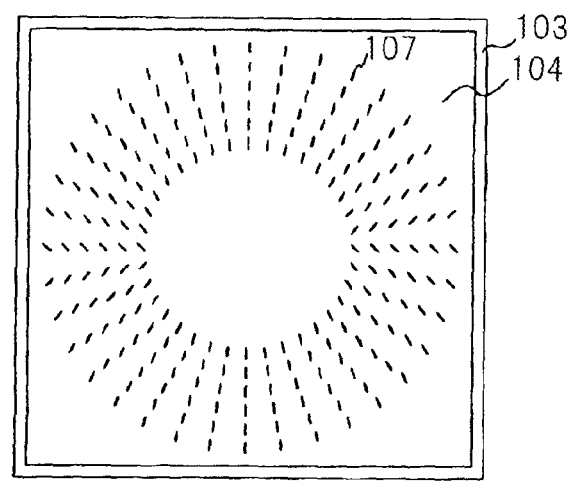
FIG. 18A is an explanatory perspective view showing the ½ wavelength plate for axially symmetric polarization included in the light source device according to the tenth embodiment.
Figure 18B:
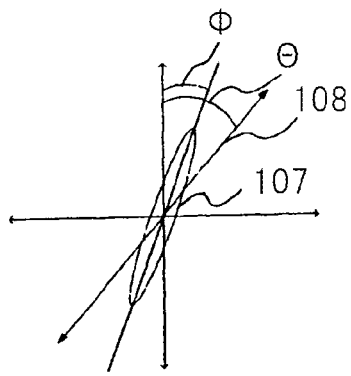
FIG. 18B is an explanatory perspective view showing the ½ wavelength plate for axially symmetric polarization included in the light source device according to the tenth embodiment.

FIGS. 18A and 18B are explanatory schematic views showing axially symmetric polarization ½ wavelength plate 100. FIG. 18A is a transverse sectional view showing a state where liquid crystal layer 104 of axially symmetric polarization ½ wavelength plate 100 is cut in parallel to the principal surface of glass substrate 101. FIG. 18B is an explanatory schematic view showing the light direction of liquid crystal molecules 107.

As shown in FIG. 18A, liquid crystal molecules 107 are concentrically arranged around axially symmetric polarization ½ wavelength plate 100. As shown in FIG. 18B, liquid crystal molecules 107 are oriented in a direction that satisfies the relationship of θ=2Φ or θ=2Φ−180, where Φ is an angle formed between the main axis of liquid crystal molecules 107 and the coordinate axis near the main axis and θ is an angle formed between the coordinate axis and the polarizing direction. FIGS. 18A and 18B show the inside of the same plane.

Figure 19:
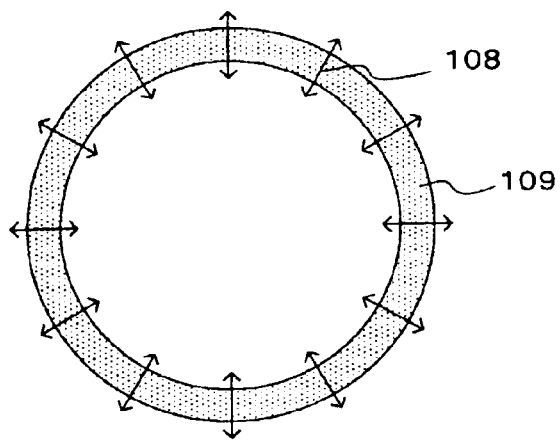
FIG. 19 is a schematic view showing a far-field pattern and a polarizing direction of output light when no ½ wavelength plate for axially symmetric polarization is included in the light source unit according to the embodiment.

FIG. 19 shows far-field pattern 109 of output light when the light source device does not include axially symmetric polarization ½ wavelength plate 100. In the first to ninth embodiments, as shown in FIG. 19, far-field pattern 109 of the output light from the light source device becomes axially polarized light where polarizing direction 108 is radial around the optical axis of the light output from the light source device.

Figure 20:
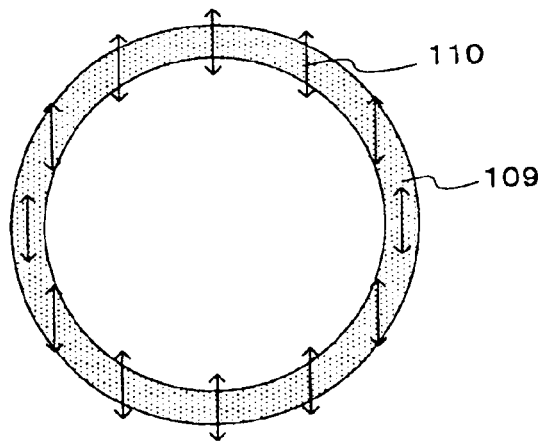
FIG. 20 is a perspective view showing a far-field pattern and a polarizing direction of output light when a ½ wavelength plate for axially symmetric polarization is included in the light source device according to the embodiment.

FIG. 20 shows far-field pattern 109 of output light that passes through axially symmetric polarization ½ wavelength plate 100. According to the present embodiment, as shown in FIG. 20, the use of axially symmetric polarization ½ wavelength plate 100 enables acquisition of output light where polarizing direction 110 is uniform.

Example 1

Figure 21:
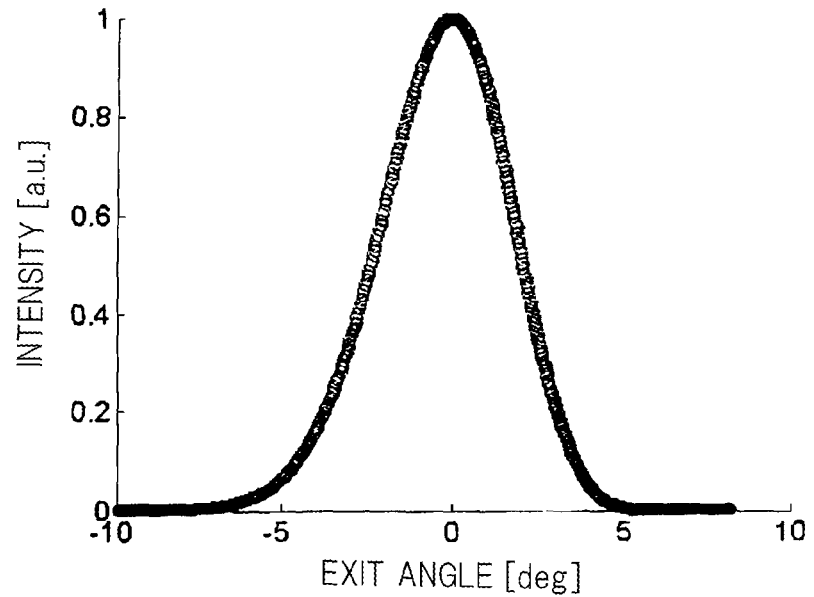
FIG. 21 shows an angle distribution in the output light of the light source device according to the first embodiment.

FIG. 21 shows the angle distribution in the output light of the light source device according to the first embodiment. In FIG. 21, a horizontal axis indicates the exit angle of output light, and the vertical axis indicates the intensity of the output light.

$SiO_2$, a phosphor of base material PVA (polyvinyl alcohol), Ag, and PMMA (polymethylmethacrylate) were respectively used for light guide body 12, carrier generation layer 16, plasmon excitation layer 17, and wave vector conversion layer 18, and thicknesses thereof were respectively set to 0.5 millimeters, 100 nanometers, 50 nanometers, and 100 nanometers. Calculation was carried out with the emission wavelength of carrier generation layer 16 set to 460 nanometers. In this case, the depth, the pitch, and the duty ratio of the periodic structure of wave vector conversion layer 18 were respectively set to 100 nanometers, 325 nanometers, and 0.5. The output light under these conditions has an light distribution not annular but near a gauss function. However, by shifting the pitch by 325 nanometers, the peak is broken, and annular light distribution can be acquired.

For simplicity, calculation was two-dimensionally carried out. When the full width of an angle where intensity of the output light from optical element 1 was halved, was an emission angle, the emission angle was ±3.4 (deg).

Thus, according to light source device 2 of the present embodiment, by enhancing directionality of the emission angle of the output light from light source device 2 and by appropriately adjusting the grating structure of wave vector conversion layer 18 to narrow the emission angle by ±5 degrees, directionality can be further improved.

Example 2

Figure 22:
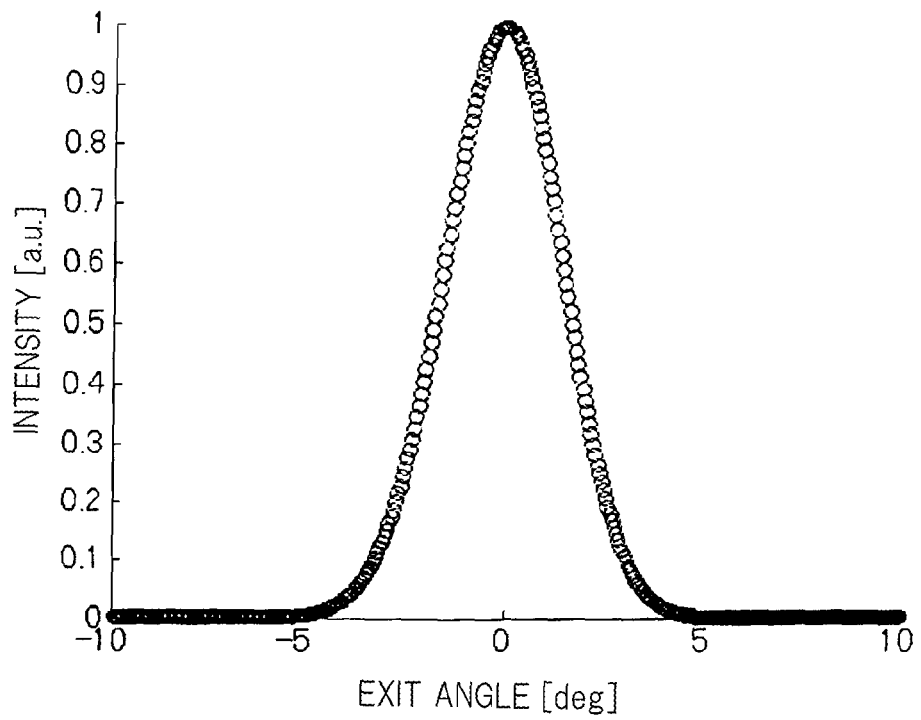
FIG. 22 shows an angle distribution in the output light of the light source device according to the fifth embodiment.

FIG. 22 shows the angle distribution in the output light of the light source device according to the fifth embodiment. In FIG. 22, a horizontal axis indicates the exit angle of output light, and a vertical axis indicates the intensity of the output light.

$SiO_2$, a phosphor of a base material PVA (polyvinyl alcohol), $Al_2O_3$, Ag, and porous $SiO_2$ were respectively used for light guide body 12, carrier generation layer 16, high dielectric constant layer 20, plasmon excitation layer 17, and low dielectric constant layer 19, and thicknesses thereof were respectively set to 0.5 millimeters, 100 nanometers, 10 nanometers, 50 nanometers, and 10 nanometers. The dielectric constant of porous $SiO_2$ was set to 1.12. As a material of wave vector conversion layer 18, PMMA (polymethylmethacrylate) was used, and the depth, the pitch, and the duty ratio of the periodic structure were respectively set to 100 nanometers, 421 nanometers, and 0.5. The output light under these conditions does not have a annular light distribution but has a light distribution which is near a gauss function. However, by shifting the pitch by 421 nanometers, a peak is broken, and an annular light distribution can be acquired. In Example 2, by arranging high dielectric constant layer 20 and low dielectric constant layer 19 to sandwich plasmon excitation layer 17, light distribution having directionality higher than that of Example 1 was acquired.

In Example 2, the effective dielectric constants of the exit side portion and the incident side portion of plasmon excitation layer 17 are respectively set to 1.48 and 2.52 by formula (1). The imaginary parts of z-direction wave numbers on the exit side and the incident side of the surface plasmon are respectively set to $8.96 \times 10^6$ and $1.71 \times 10^7$ by formula (2). When the effective interactive distance of the surface plasmon is a distance where the intensity of the surface plasmon is $e^{-2}$, by 1/1 meters ($k_{spp,z}$), the effective interactive distances of the surface plasmon are respectively 112 nanometers and 58 nanometers on the exit side and the incident side.

Figure 23:
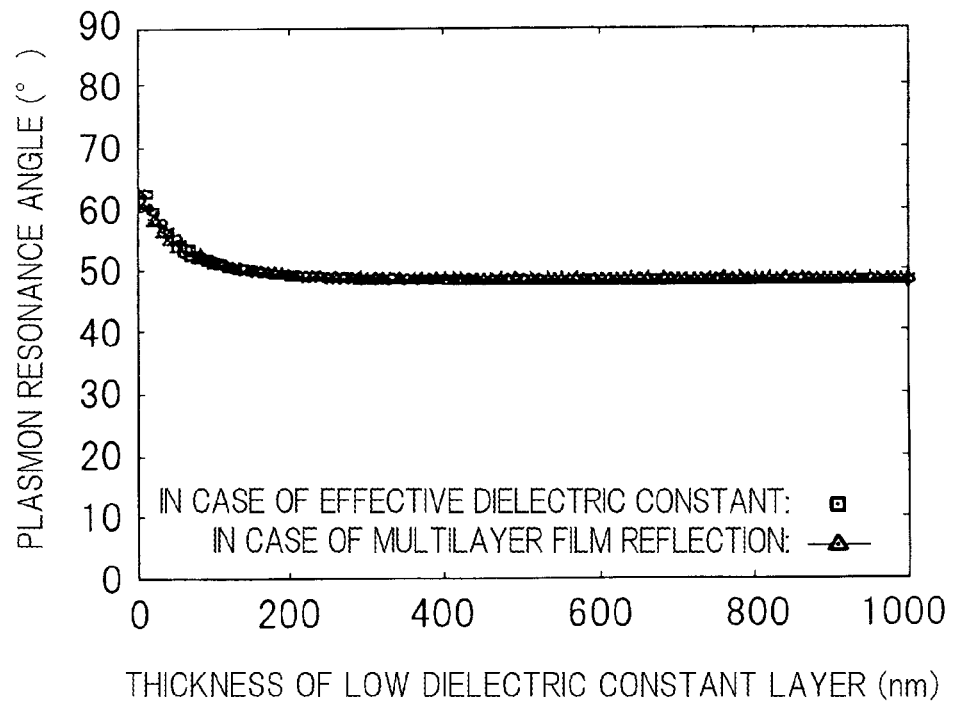
FIG. 23 shows comparison of a plasmon resonance angle obtained from an effective dielectric constant with a plasmon resonance angle obtained from multilayer film reflection calculation in the light source device according to the fifth embodiment.

FIG. 23 shows comparison of a plasmon resonance angle (□ in the drawing) obtained from an effective dielectric constant calculated by using formula (1) with a plasmon resonance angle (Δ in the drawing) obtained from multilayer film reflection calculation in light source device 2 according to the fifth embodiment. Calculation conditions are similar to those except for the thickness of low dielectric constant layer 19 when the angle distribution was calculated. In FIG. 23, a horizontal axis indicates the thickness of low dielectric constant layer 19, and a vertical axis indicates the plasmon resonance angle. As shown in FIG. 23, the value calculated by an effective dielectric constant and the value calculated by multilayer film reflection match each other, and the condition of plasmon resonance can apparently be defined by the effective dielectric constant defined by formula (1).

The light source device according to the present embodiment, which is suitably used as a light source device of an image display device, can be used for a light source device included in a projection display device, a near-field light source device of a liquid crystal panel (LCD), a mobile phone as a backlight, and an electronic device such as a PDA (Personal Data Assistant).

Figure 24:
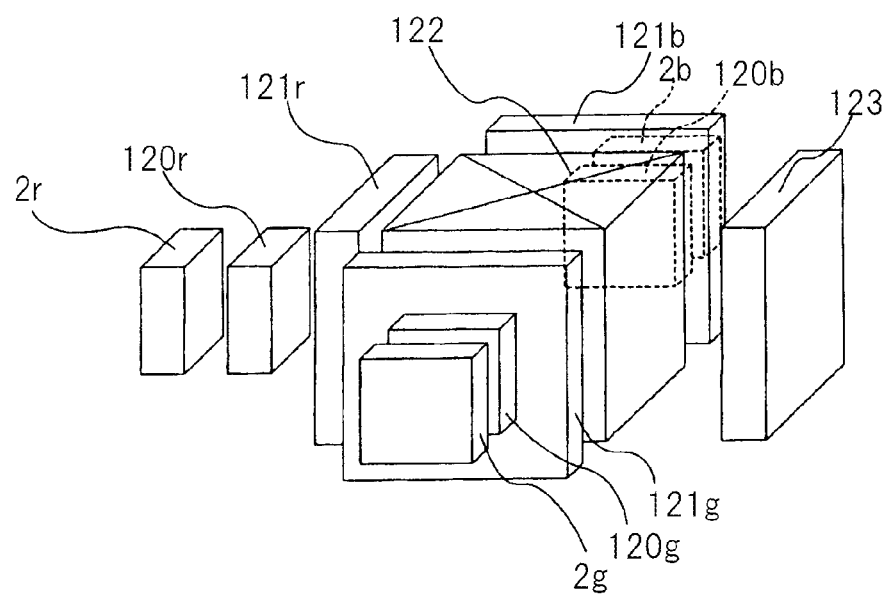
FIG. 24 is a perspective view schematically showing the LED projector of the embodiment.

Lastly, a configuration example of a LED projector serving as a projection display device to which the first to tenth embodiments are applied will be briefly described. FIG. 24 is a perspective view schematically showing the LED projector of the embodiment.

As shown in FIG. 24, the LED projector according to the embodiment includes red (R) light source device 2r, green (G) light source device 2g, and blue (B) light source device 2b, illumination optical systems 120r, 120g, and 120b into which lights output from light source devices 2r, 2g, and 2b enter, and light valves 121r, 121g, and 121B as display elements into which the lights that passes through illumination optical systems 120r, 120g, and 120b enter. The LED projector further includes cross dichroic prism 122 that synthesizes R, G, and B lights entered after modulation by light valves 121r, 121g, and 121b, and projection optical system 123 that includes a projection lens (not shown) for projecting the light output from cross dichroic prism 122 to a projection surface such as a screen.

The LED projector is applied to a three-plate projector. Illumination optical systems 120r, 120g, and 120b include, for example, rod lenses (not shown) for making luminance uniform. Light valves 121r, 121g, and 121b include, for example, liquid crystal display plates or DMDs. Needless to say, the light source device of the abovementioned embodiment can be applied to a single-plate projector.

According to the LED projector of the present embodiment, by applying the light source device of the aforementioned embodiment, the luminance of a projected image can be improved.

In the LED projector, axially symmetric polarization ½ wavelength plate 100 shown in FIG. 17 and FIGS. 18A and 18B is preferably located on the optical path of the light output from each of light source devices 2r, 2g, and 2b. This can suppress polarized light loss at light valves 121r, 121g, and 121b. When the illumination optical system includes a polarizer, axially symmetric polarization ½ wavelength plate 100 is preferably located between the polarizer and light source device 2.

The present invention has been described referring to the embodiments. However, the present invention is not limited to the embodiments. Various changes understandable to those skilled in the art can be made to the configuration and the specifics of the present invention.

This application claims priority from Japanese Patent Application No. 2010-047944 filed Mar. 4, 2010, which is hereby incorporated by reference herein in its entirety.

The invention claimed is:

1. An optical element comprising:
   a light guide body into which light from a light-emitting element enters;
   a carrier generation layer formed in the light guide body, in which carriers are generated by the light from the light guide body;
   a plasmon excitation layer stacked above the carrier generation layer, which has a plasma frequency higher than a frequency of light generated when the carrier generation layer is excited by the light from the light-emitting element; and
   an exit layer stacked above the plasmon excitation layer, which converts a surface plasmon generated by the plasmon excitation layer into light having a predetermined exit angle to output the light,
   wherein the plasmon excitation layer is sandwiched between two layers having dielectric properties; and
   an effective dielectric constant of an incident side portion of the plasmon excitation layer including an entire structure stacked above the light guide body side is higher than that of an exit side portion of the plasmon excitation layer including an entire structure stacked above the exit layer side and a medium in contact with the exit layer.

2. The optical element according to claim 1, wherein:
   the effective dielectric constant is determined based on a dielectric constant distribution of dielectrics in the incident side portion or the exit side portion and based on a distribution of a surface plasmon in the direction vertical to the interface of the plasmon excitation layer in the incident side portion or the exit side portion.

3. The optical element according to claim 1, further comprising a dielectric constant layer formed adjacently to at least one of the exit layer side of the plasmon excitation layer and the light guide body side of the plasmon excitation layer.

4. The optical element according to claim 1, wherein:
   the plasmon excitation layer is sandwiched between the pair of dielectric constant layers; and
   a dielectric constant of the dielectric constant layer adjacent to the light guide body side of the plasmon excitation layer is higher than that of the dielectric constant layer adjacent to the exit layer side of the plasmon excitation layer.

5. The optical element according to claim 3, wherein the dielectric constant layer located adjacently to the exit layer side of the plasmon excitation layer is formed by stacking a plurality of dielectric constant layers having different dielectric constants, and the plurality of dielectric constant layers is arranged to be lower in dielectric constant from the plasmon excitation layer side to the exit layer side.

6. The optical element according to claim 3, wherein the dielectric constant layer located adjacently to the light guide body side of the plasmon excitation layer is formed by stacking a plurality of dielectric constant layers having different dielectric constants, and the plurality of dielectric constant layers is arranged to be higher in dielectric constant from the carrier generation layer side to the plasmon excitation layer side.

7. The optical element according to claim 3, wherein the dielectric constant layer located adjacently to the exit layer side of the plasmon excitation layer has a distribution of dielectric constants that gradually decrease from the plasmon excitation layer side to the exit layer side.

8. The optical element according to claim 3, wherein the dielectric constant layer located adjacently to the exit layer side of the plasmon excitation layer is a porous layer.

9. The optical element according to claim 3, wherein the dielectric constant layer located adjacently to the light guide body side of the plasmon excitation layer has a distribution of dielectric constants that gradually increase from the carrier generation layer side to the plasmon excitation layer side.

10. The optical element according to claim 1, further comprising another plasmon excitation layer having a higher plasma frequency than a frequency of the light-emitting element, which is formed between the light guide body and the carrier generation layer.

11. The optical element according to claim 1, further comprising a low dielectric constant layer formed adjacently to the carrier generation layer side of the light guide body and having a lower dielectric constant than the light guide body,
wherein in the carrier generation layer, carriers are generated by an evanescent wave generated when the light from the light guide body is in a condition of total reflection on an interface with the carrier generation layer.

12. The optical element according to claim 1, wherein the plasmon excitation layer is formed by stacking a plurality of metal layers made of different metallic materials.

13. The optical element according to claim 1, wherein the exit layer has a surface periodic structure.

14. The optical element according to claim 1, wherein the plasmon excitation layer is made of one element selected from among Ag, Au, Cu, Pt and Al, or an alloy containing at least one of the elements.

15. A light source device comprising:
the optical element according to claim 1; and
a light-emitting element located on an outer circumferential part of the light guide body.

16. The light source device according to claim 15, further comprising a polarizing conversion element for arranging axially symmetric polarized light incident from the optical element in a predetermined polarized state.

17. A projection display device comprising:
the light source device according to claim 15;
a display element that modulates light output from the light source device; and
a projection optical device that projects a projected image by light output from the light source device.

* * * * *